(12) United States Patent
Zahorán et al.

(10) Patent No.: US 9,473,651 B2
(45) Date of Patent: Oct. 18, 2016

(54) PARALLEL METADATA ENTRY AND PHYSICAL SCANNING

(71) Applicant: Nuance Communications, Inc., Burlington, MA (US)

(72) Inventors: Ákos Zahorán, Budapest (HU); Tibor Attila Sás, Budapest (HU); Gábor Pesti, Budapest (HU); Miklós Osim, Budapest (HU); Béla Czinege, Budapest (HU); György László Várszegi, Budapest (HU)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 14/573,171

(22) Filed: Dec. 17, 2014

(65) Prior Publication Data
US 2016/0182747 A1 Jun. 23, 2016

(51) Int. Cl.
*H04N 1/04* (2006.01)
*H04N 1/00* (2006.01)

(52) U.S. Cl.
CPC ................. *H04N 1/00408* (2013.01)

(58) Field of Classification Search
CPC .................................... H04N 1/00408
USPC ......................... 358/474, 498, 497
See application file for complete search history.

(56) References Cited

U.S. PATENT DOCUMENTS

| 2009/0070348 | A1* | 3/2009 | Uejo ............................. 707/100 |
| 2010/0318581 | A1* | 12/2010 | Miyazaki ............... G06Q 10/10 707/803 |

* cited by examiner

*Primary Examiner* — Houshang Safaipour
(74) *Attorney, Agent, or Firm* — Hamilton, Brook, Smith & Reynolds, P.C.

(57) ABSTRACT

A scanning system provides for scanning documents and generating respective electronic copies with associated metadata. A scanner scans one or more documents to produce respective electronic copies. A user interface captures metadata entered by a user regarding the documents. A controller is communicatively coupled to the scanner and the user interface, and enables the user interface to capture the metadata concurrently with the scanner's scanning the documents. The electronic copy and the metadata can be associated with one another or incorporated into a common file. Parallel metadata entry and physical scanning reduces time a user spends to perform the overall process, resulting in increased user satisfaction.

20 Claims, 14 Drawing Sheets

PARALLEL METADATA ENTRY AND PHYSICAL SCANNING

BACKGROUND

A multifunction printer (MFP) typically provides a number of services for processing documents, and can incorporate the features of a photocopier, printer, scanner, and/or a fax machine, as well as an interface to communicate across a network. A MFP may also include an integrated user interface (UI), or may interface with a user across the network. In order to scan a document and produce an electronic copy of the document, a user typically positions the document at the scanner and sets scanning parameters at the UI. If the electronic copy is to include user-defined metadata, the user may also enter the metadata at the UI before or after the scan.

SUMMARY

Example embodiments of the present invention provide a system for scanning documents and generating respective electronic copies with associated metadata. The system may provide for scanning the documents in parallel with entering metadata by a user, thereby minimizing the total time of a scanning operation. The system may include a scanner to scan one or more documents to produce respective electronic copies. A user interface captures metadata entered by a user regarding the documents. Further, a controller is communicatively coupled to the scanner and the user interface, and enables the user interface to capture the metadata concurrently with the scanner's scanning the documents. The controller may further associate the electronic copy and the metadata.

In further embodiments, the controller may update the electronic copy to incorporate at least a portion of the metadata, or to modify the electronic copy based on the metadata. Such metadata can include, for example, a filename, a file path, bibliographic information, and a watermark. The controller may also populate at least a portion of the metadata automatically by extracting content from the electronic copy of the documents and modifying the metadata to include the content. The documents may include several individual documents, and the controller enables the user interface to capture metadata for the plurality of documents concurrently with the scanner's scanning the several documents.

In still further embodiments, the controller may detect an interrupt event (e.g., an error) from the scanner or the user interface. The controller may control the user interface to display selectively the interrupt event and a prompt to capture the metadata based on a respective priority. The controller may also define parameters for the scanning of documents based on a selection by a user at the user interface. The controller may further modify the electronic copy based on information entered by the user at the user interface. Such information may indicate an image transformation for the electronic copy, such as a page layout format or dimensions.

In yet further embodiments, the controller may be communicatively coupled to the scanner across a network. Likewise, the user interface may be incorporated into a computing device (e.g., a workstation, smartphone, or tablet device) communicatively coupled to the scanner across a network. The controller may also be incorporated into the computing device, or may be incorporated into a server that is also communicatively coupled to the scanner across the network. The controller may also be communicatively coupled to a plurality of additional scanners.

In still further embodiments, the scanner may also provide for generating at least one physical copy of the at least one document. For example, the scanner may be implemented in a multifunction printer (MFP). Likewise, the scanner may be a MFP and the term "scanner" may be used herein interchangeably with the term "MFP."

A further embodiment of the invention includes an apparatus used in cooperation with a system for scanning documents. The apparatus may include a controller having an interface configured to communicatively couple to a scanner and a user interface. The controller may be configured to enable the user interface to capture metadata entered by a user concurrently with enabling the scanner to scan at least one document, the controller being further configured to associate the electronic copy and the metadata.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 5A1-C2 are flow diagrams illustrating a process of scanning a succession of documents in one embodiment.

DETAILED DESCRIPTION OF THE DISCLOSURE

A description of example embodiments of the invention follows.

Previous multifunction printers (MFPs) and other scanning systems provide a serial workflow, whereby the operations of metadata entry and document scanning are completed in succession. This serial workflow must be repeated for any number of documents to be scanned. As a result, the total time to complete a scan of one or more documents is extensive, and requires a user to be present at the scanning device for the duration of the scan.

Example embodiments of the invention provide a system for scanning documents and generating respective electronic copies with associated metadata. The system may provide for scanning the documents in parallel with entering metadata by a user, thereby minimizing the total time of a scanning operation. The system may include a scanner to scan one or more documents to produce respective electronic copies. A user interface captures metadata entered by a user regarding the documents. Further, a controller is communicatively coupled to the scanner and the user interface, and enables the user interface to capture the metadata concurrently with the scanner's scanning the documents. The controller may further associate the electronic copy and the metadata.

Figure 1:
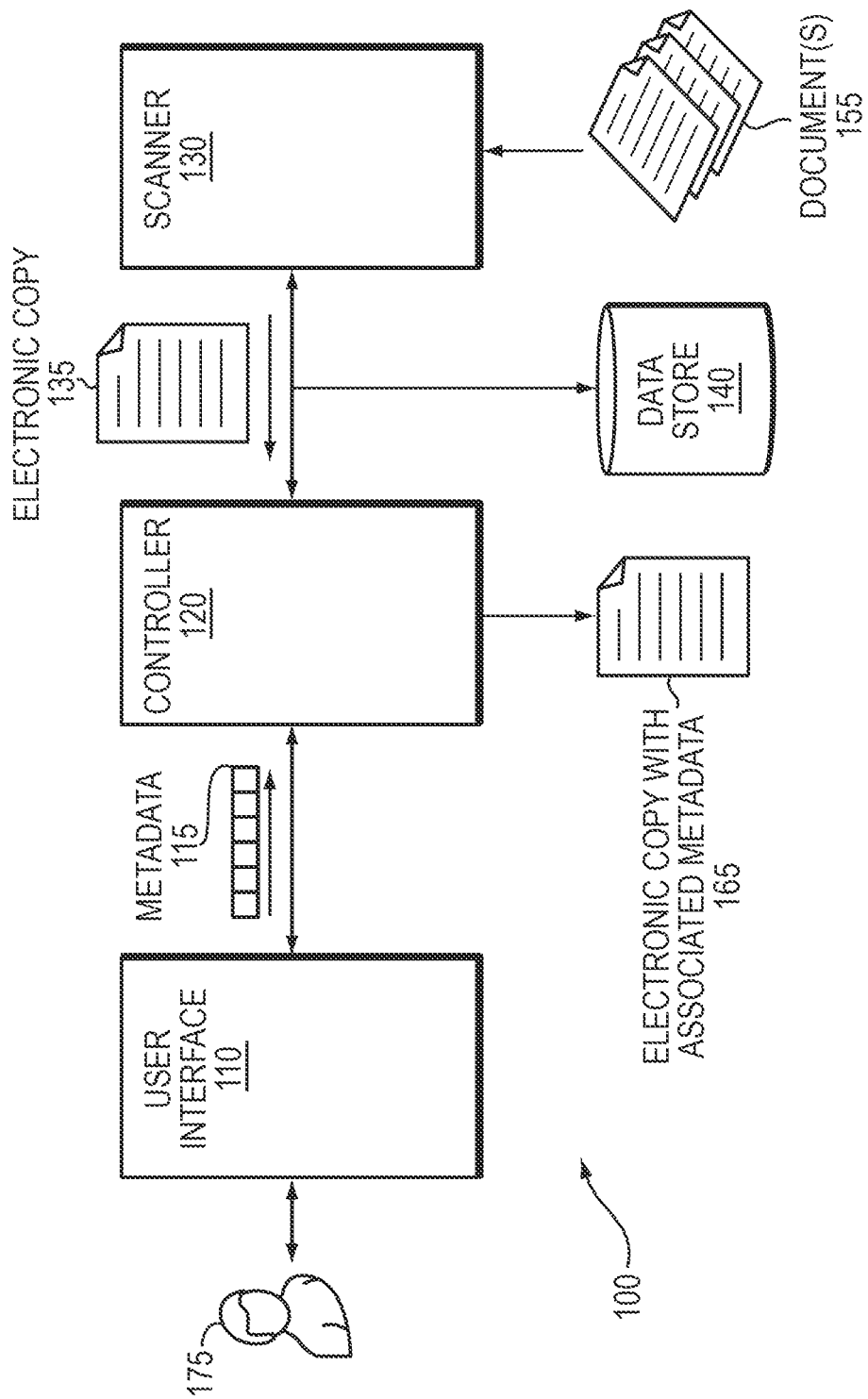
FIG. 1 illustrates a scanning system in one embodiment.

FIG. 1 illustrates a scanning system 100 in one embodiment. The system 100 may include a user interface 110, a controller 120, and a scanner 130, which may be communicatively coupled to one another or implemented in one or more devices in a number of different configurations. For example, a multifunction printer (MFP) (not shown) may incorporate one or more of the user interface 110, controller 120 and scanner 130. Alternatively, the user interface 110, controller 120 and scanner 130 may be implemented in one or more networked devices (e.g., a computing device, a server, a scanner device) that are communicatively coupled across a network. Example embodiments including such configurations are described in further detail below with reference to FIGS. 3A-C.

The scanner 130 provides for capturing images of documents 155 to generate a respective electronic copy 135 of the document 155. The scanner 130 may be implemented, for example, in a flatbed scanner, a subsystem of a MFP, or another image-capturing device. The scanner 130 may be communicatively coupled to the controller 120, as well as to a data store 140 (e.g., a network server, a database, or an integrated storage device) for storing the electronic copy 135.

The user interface 110 enables a user 175 to initiate and control a scan of the documents 155, as well as to enter metadata 115 to be associated or incorporated into the electronic copy 135 of the documents 155. The user interface 110 may be a component of a MFP or implemented in a computing device such as a tablet, smartphone or workstation. The user interface 110 may include a touchscreen display for accepting user input and providing information to the user 175 regarding the scanning process and workflow. In particular, the user interface 110 may prompt the user 175 to initiate a scan, enter parameters for the scan (e.g., image properties, page formatting, output file type), enter metadata 115 regarding the scanned documents 155, and enter additional information for processing the documents 155 or the electronic copy 135. The metadata 115 may include, for example, a filename, a file path, bibliographic information, a watermark, and metadata fields associated with a particular file type of the electronic copy 135.

The controller 120 is communicatively coupled to both the user interface 110 and the scanner 130, and generally manages a scanning operation. In particular, the controller 120 may communicate with the user interface 110 to enable a user 175 to initiate a scanning operation and enter information regarding the scan, including scanning parameters and the metadata 115. Based on the scanning parameters, the controller 120 communicates with the scanner 130 to enable scanning the documents 155 to generate a respective electronic copy 135, which may be stored to the data store 140. In order to minimize the total time required for the scanning operation, the controller 120 may enable the user interface 110 to capture the metadata 115 concurrently with the scanner's 130 scanning the documents 155. Thus, both the scanning by the scanner 130 and metadata entry at the user interface 110 may occur in parallel and independently of one another. Further, when the documents 155 include multiple separate documents to be scanned in succession, the controller 120 may enable the user 175 to enter metadata 115 for each of the multiple separate documents while simultaneously controlling the scanner 130 to scan each of the multiple documents 155 in succession.

Once the scanning parameters are established, the controller 120 may control the scanner 130 to scan the entirety of the documents 155 without further prompting of the user 175. However, if the controller 120 detects an interrupt event (e.g., an error such as a paper jam indicated by the scanner 130), the controller 120 may prompt the user 175, via the user interface 110, to address the interrupt event. The controller may selectively display such prompts, and optionally interrupt a metadata entry process, based on a given priority of the interrupt event.

The controller 120 may then further process the electronic copy 135, for example by associating it with the metadata 115 or updating the electronic copy 135 to incorporate at least a portion of the metadata 115. The controller 120 may also extract content from the electronic copy 135 (e.g., via optical character recognition (OCR) processing) to derive additional metadata, which can be used to populate metadata fields of the electronic document 135. As a result, the controller 120 provides a processed electronic copy 165 having associated and/or incorporated metadata. The controller 120 may then forward the processed electronic copy 165 in accordance with destination parameters as defined by the user 175 at the user interface 110. For example, the controller 120 may store the processed electronic copy 165 to the data store 140 or another storage device (e.g., a networked database, a data server, a cloud-based storage service). The controller 120 may also forward the copy 165 to one or more email addresses as selected by the user 175, fax the document to a destination fax number indicated by the user 175, and/or may enter the copy 165 into a document management system (e.g., SharePoint™, iManage Worksite™) based on the metadata 115 and/or destination parameters entered by the user 175. An example scanning operation is described in further detail below with reference to FIG. 2.

Figure 2:
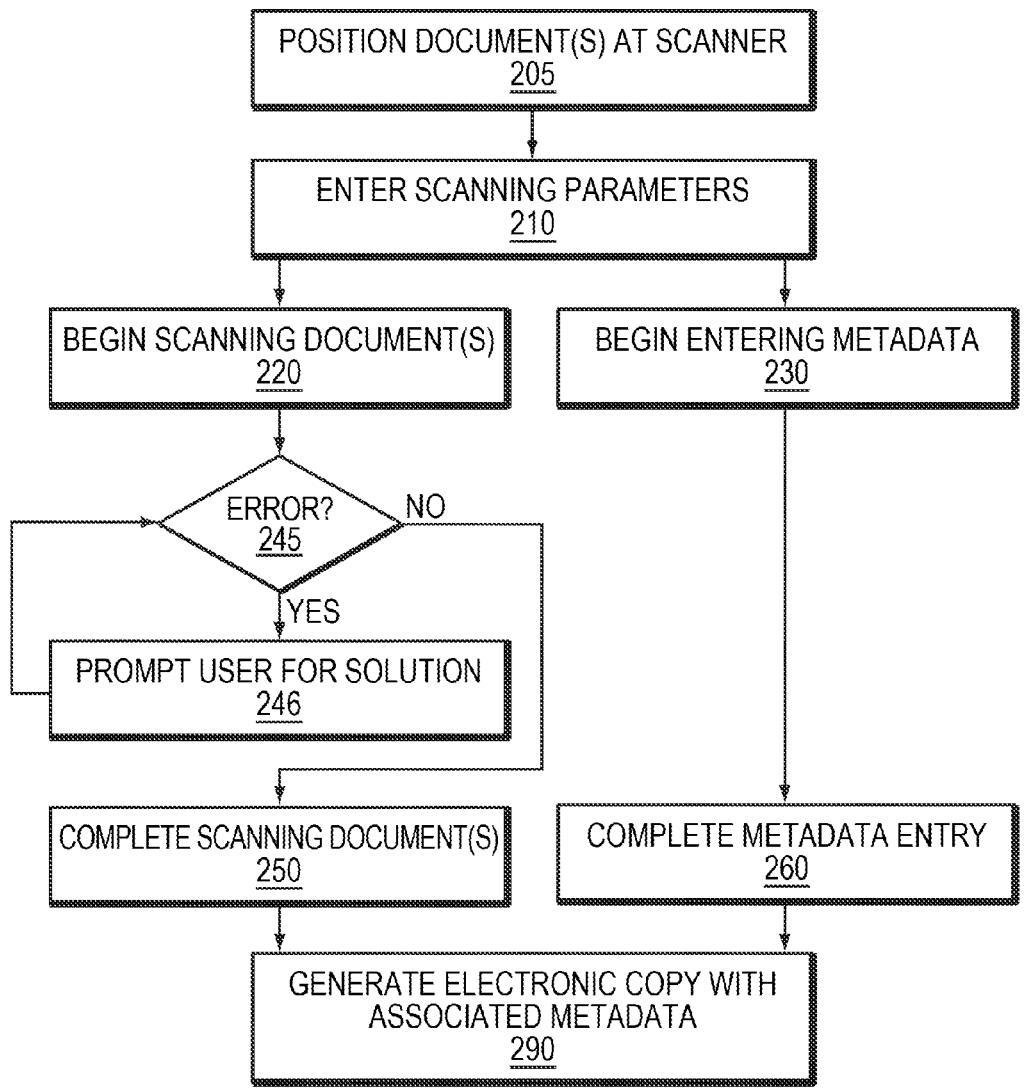
FIG. 2 is a flow diagram of a process of scanning a document in one embodiment.

FIG. 2 is a flow diagram of a process 200 of scanning a document in one embodiment. With reference to FIG. 1, a user 175 may first position one or more documents 155 to be scanned at the scanner 130 (205). At the user interface 110, the user 175 then initiates the scan and enters scanning parameters, such as image capture properties, page formatting, and output file type (210). In response, the controller 120 controls the scanner 130 to begin scanning the documents 155 (220), while concurrently enabling the user 175 to begin entering the metadata 115 at the user interface (230). If the controller 120 detects an error (245), such as a paper jam, during the scan, then the controller 120 may prompt the user 175 via the user interface 110 to provide a solution (246). Depending on the priority of the error, the prompt may interrupt the metadata entry at the user interface 110.

When the scanner 130 completes the scan (250) to produce the respective electronic copy 135 of the documents 155, and when the metadata entry at the user interface 110 is complete (260), the controller 120 may further process the electronic copy 135 to associate and/or incorporate at least a portion of the metadata 115 into the copy 135. As a result, the controller generates a processed electronic copy 165 of the scanned documents 155 (290).

Figure 3A:
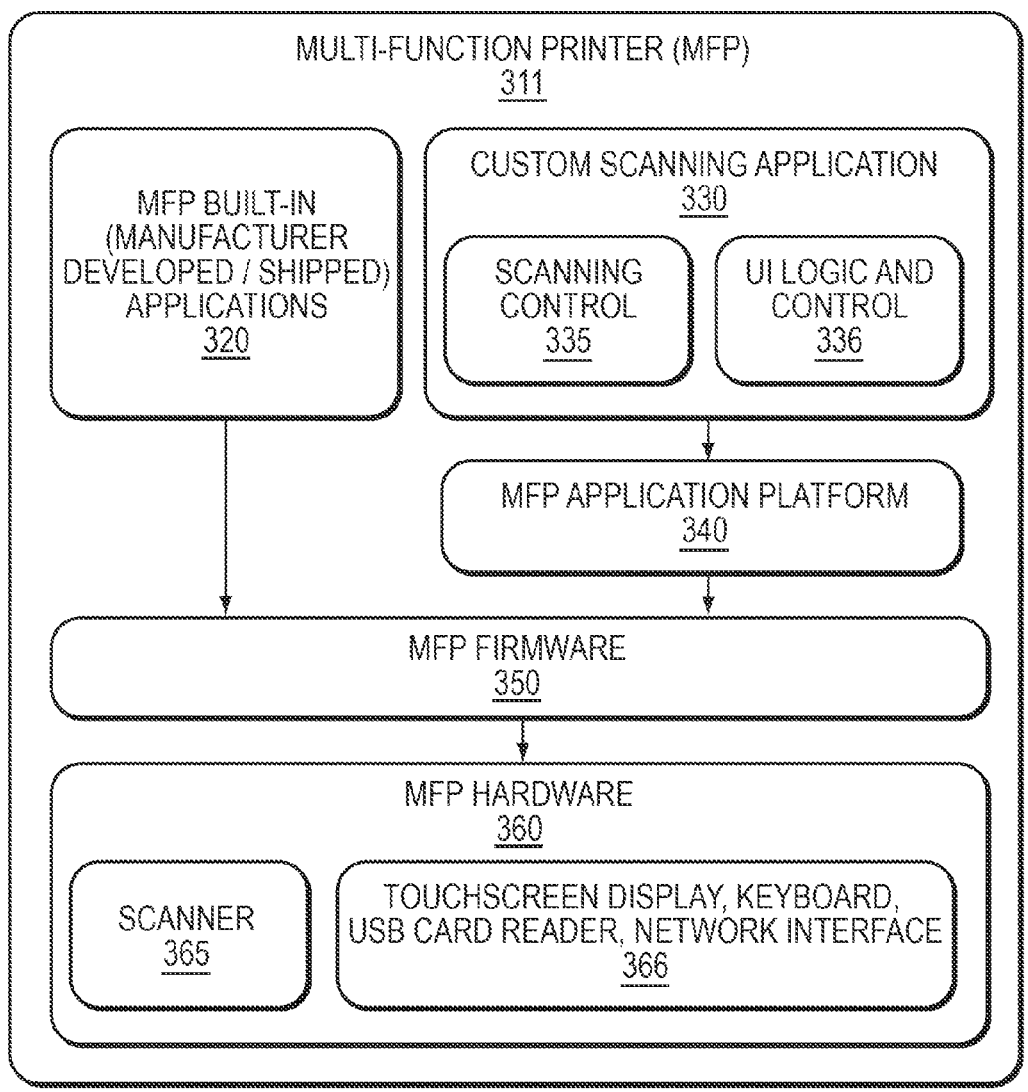
FIG. 3A is a block diagram of a multi-function printer (MFP) incorporating one embodiment.
Figure 3B:
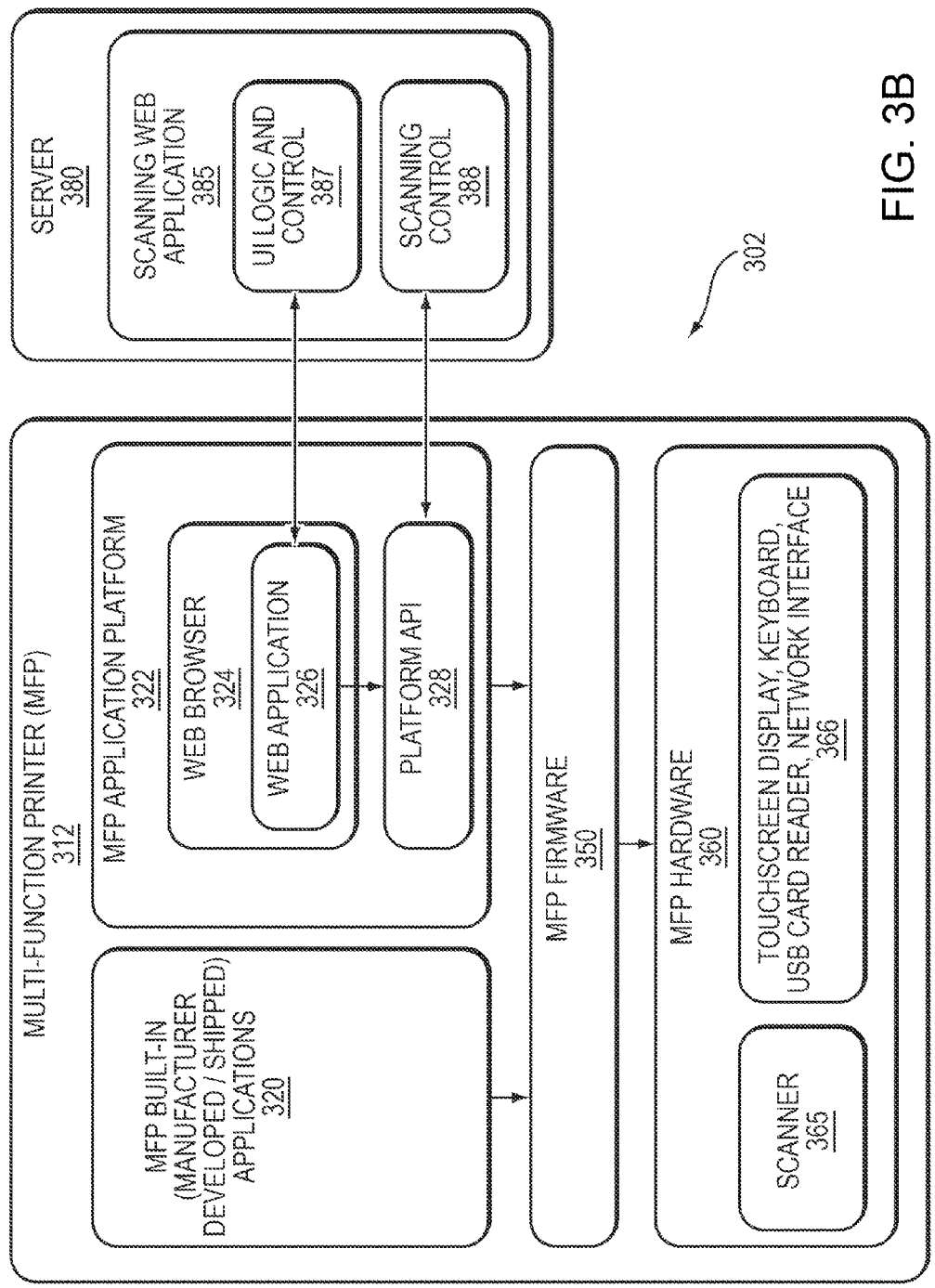
FIG. 3B is a block diagram of a MFP interconnected with a server in one embodiment.
Figure 3C:
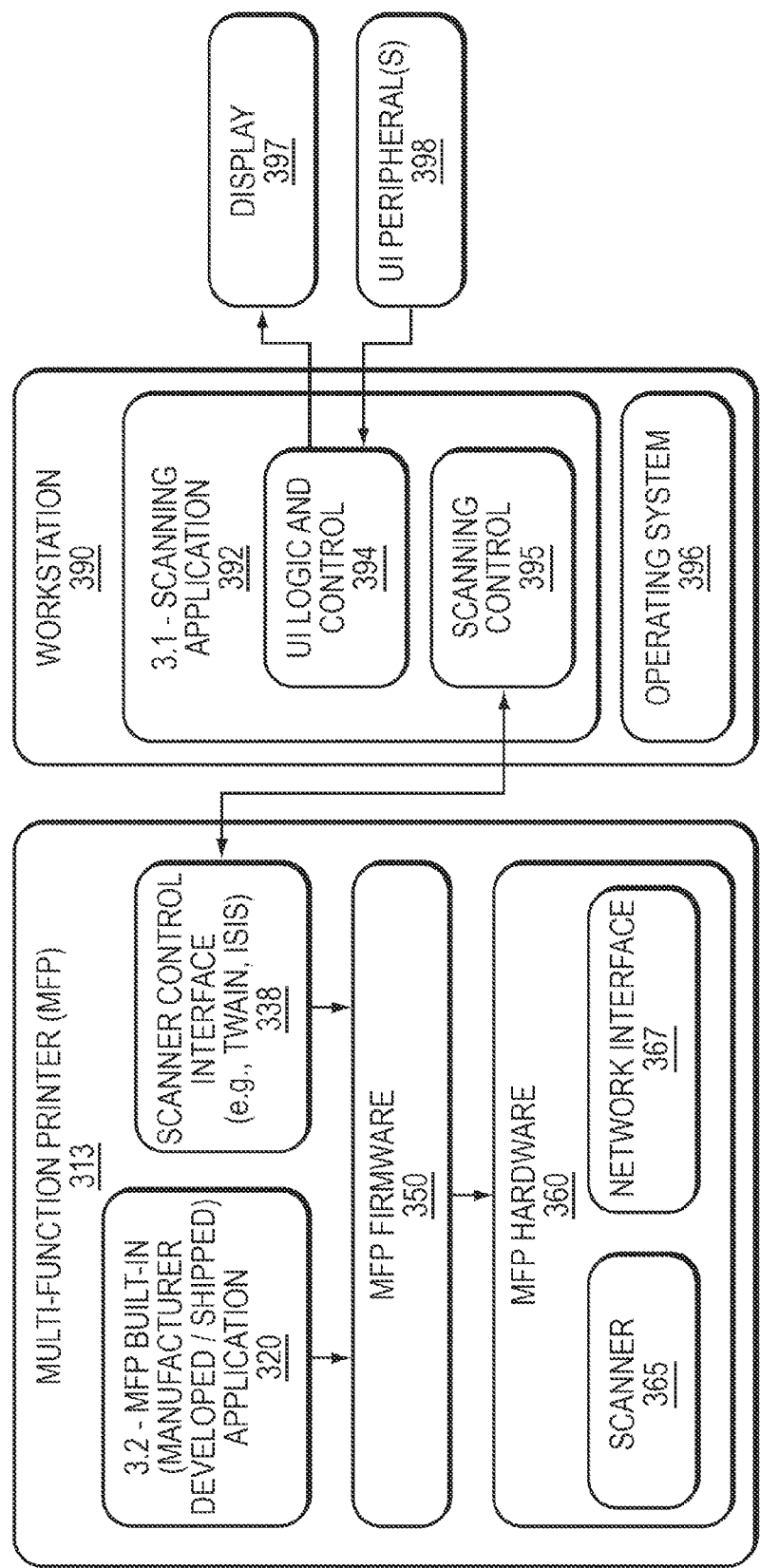
FIG. 3C is a block diagram of a MFP interconnected with a computer workstation in one embodiment.

FIGS. 3A-C illustrate various configurations of example scanning systems 301-303 according to respective embodiments. Each of the systems 301-303 may incorporate some or all of the features of the system 100 and process 200 described above with reference to FIGS. 1 and 2. The systems 301-303 are described in further detail below.

FIG. 3A illustrates a scanning system 301 including a multifunction printer (MFP) 311. The MFP 311 may provide a number of services for processing documents, including photocopying, printing, scanning, faxing, and may also provide user and network communications interfaces. The MFP 311 includes MFP hardware 360, which may include a scanner 365 and a user interface 366 (e.g., a touchscreen display, keyboard, USB card reader, and/or network interface). The scanner 365 and user interface 366 may incorporate some or all of the features of the scanner 130 and user interface 110, respectively, as described above with reference to FIGS. 1 and 2.

MFP firmware 350 provides an internal software layer for interfacing between the MFP hardware 360 and a number of software applications and application platforms, including an MFP embedded application package 320, MFP application platform 340, and custom scanning applications 330. The embedded application package 320 may include applications to operate the MFP hardware 360, and can be configured in accordance with the respective application programming interface (API) of each hardware component. The embedded application package 320 may include software to operate several services of the MFP 311, including photocopying, scanning, printing, and configuration routines. In contrast, custom scanning applications 330 may provide additional software-based services or supersede the services provided by the embedded application package 320, and can be configured for a specific deployment of the MFP 311. The custom scanning applications 330 can include scanning control applications 335 and user interface logic and control applications 336, which can provide services such as authentication and feature access control, print job control, scanning and document delivery, and tracking of print and scan jobs. The custom applications may be supported by an MFP application platform 340, which may include a collection of software libraries and APIs. The applications 320, 330, in combination with processing components of the MFP hardware 360, may incorporate some or all of the features of the controller 120 as described above with reference to FIGS. 1 and 2.

FIG. 3B illustrates a scanning system 302 including a MFP 312 communicatively coupled to a server 380. In contrast to the embedded platform of the system 301 described above, the system 302 provides a web browser-based platform as an infrastructure for the user interface and the custom applications, which can be operated by server 380. Thus, some or all control and user interface functions may be provided by the server 380. To provide such a configuration, the MFP 312 may be configured in a manner comparable to the MFP 311 of FIG. 3A, but includes a MFP application platform 322 that is configured for interfacing with the server 380. The platform 322 may include a platform API 328 and a web browser 324 operating a web-based application 326. The server 380 operates a scanning web application 385 that may be accessed by an authenticated computing device across a network, and includes a user interface logic and control application 387 and scanning control application 388. The user interface logic and control application 387 may provide a network-accessible, web-based user interface for managing a scanning operation and/or entering metadata associated with the scan. Likewise, the scanning control application 388 may provide for managing the scanner 365 during a scan operation.

FIG. 3C illustrates a scanning system 303 including a MFP 313 communicatively coupled to a workstation 390. The MFP 313 may be configured in a manner comparable to the MFPs 311, 312 of FIGS. 3A-B, but includes a scanner control interface (e.g., TWAIN or Image and Scanner Interface Specification (ISIS) interface) 338 for communicative coupling to a workstation 390 (e.g., a desktop computer, tablet computer or other computing device). Further, the MFP hardware 360 may include a network interface 367. The workstation 390 runs an operating system 396 (e.g., the Microsoft Windows™ operating system) and includes a scanning application 392 for controlling operation of the scanner 365 and providing a user interface at a display 397 and interface peripherals 398 (e.g., mouse, keyboard, and/or touchscreen) for enabling a user to configure and enter metadata for a scanning operation. The scanning applications 392 may include a user interface logic and control application for providing the user interface, as well as a scanning control application 395 for managing the scanner 365 during a scan operation.

Figure 4A:
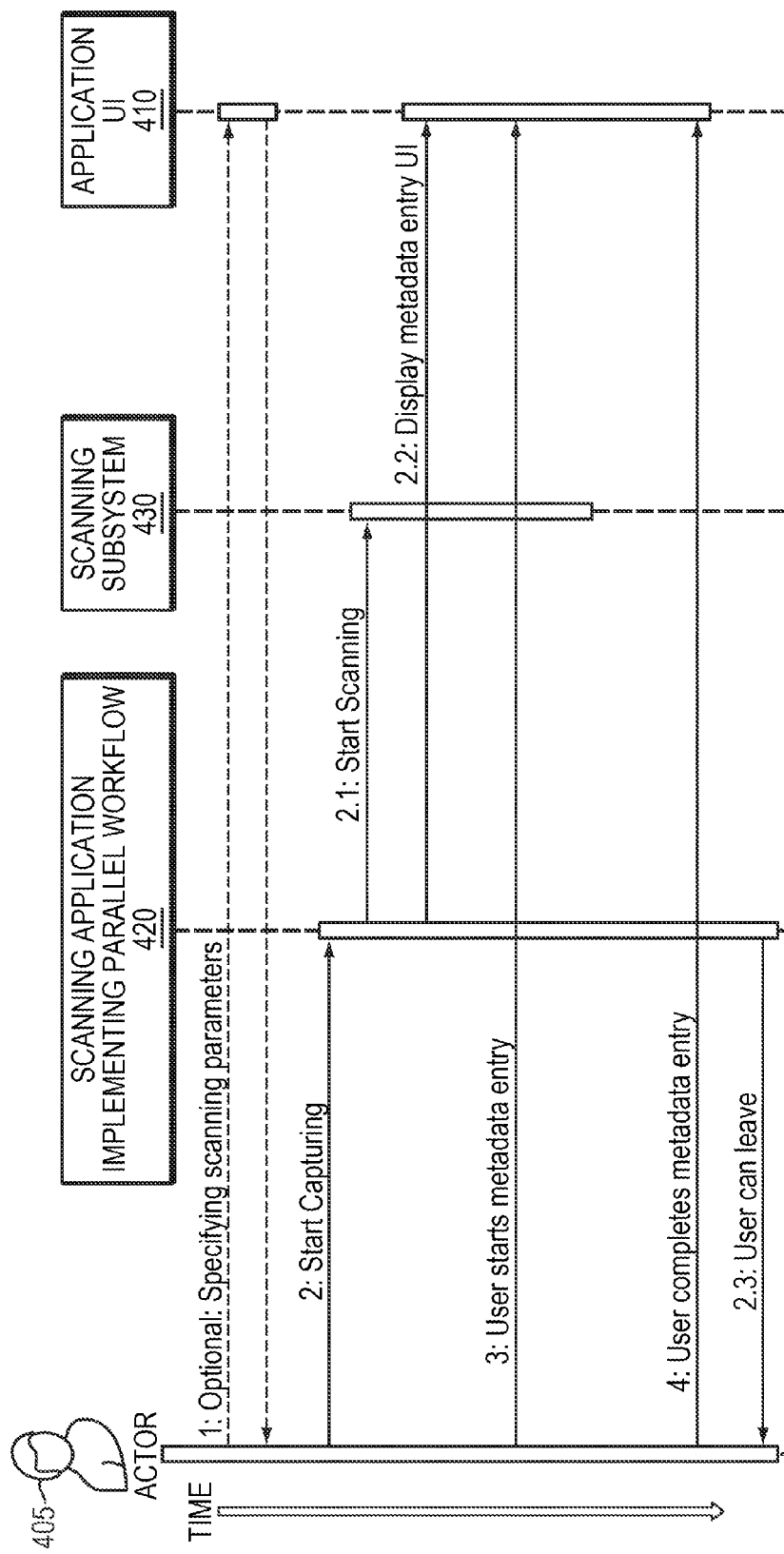
FIGS. 4A-C are flow diagrams illustrating processes of scanning one or more documents in one embodiment.
Figure 4B:
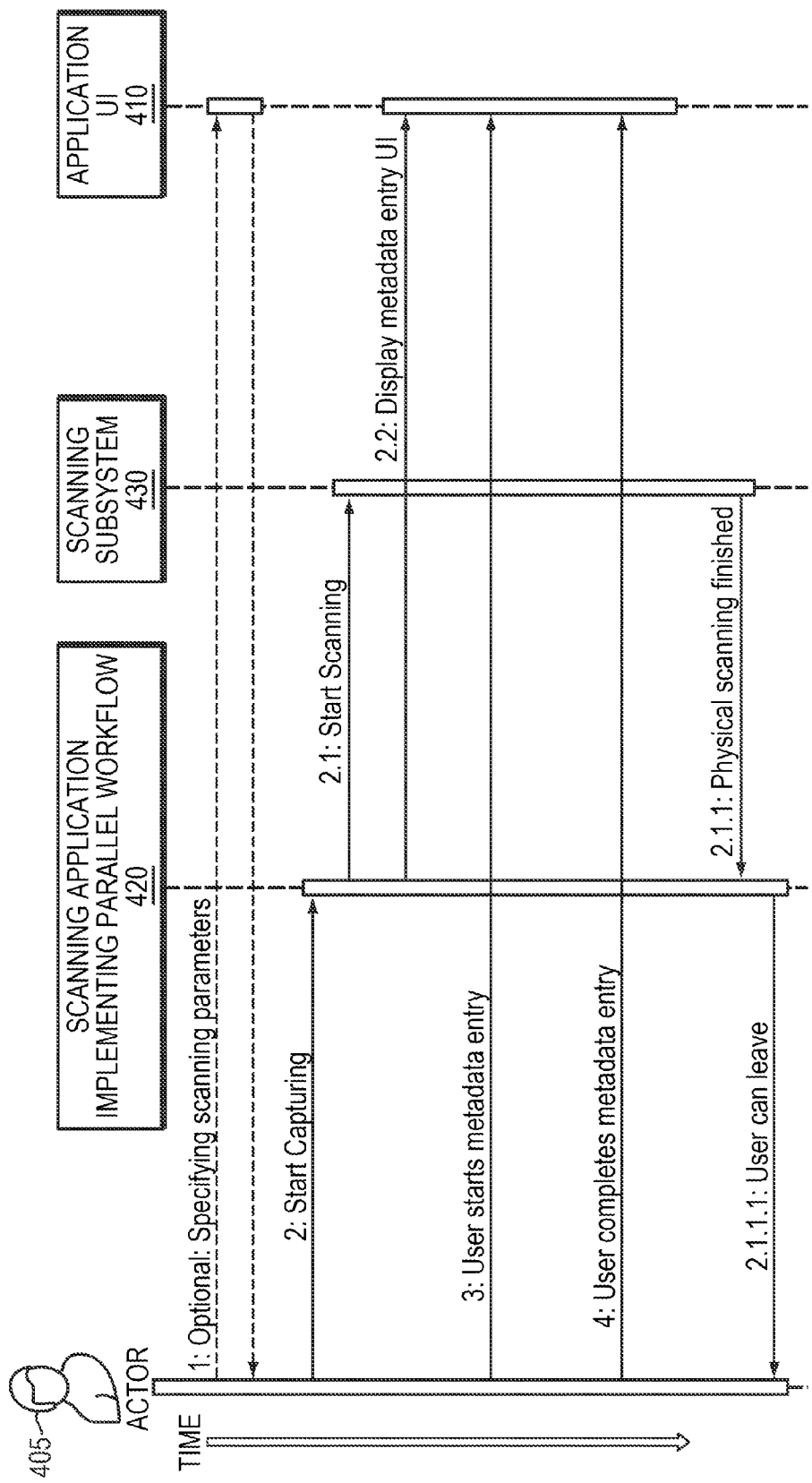
Figure 4C:
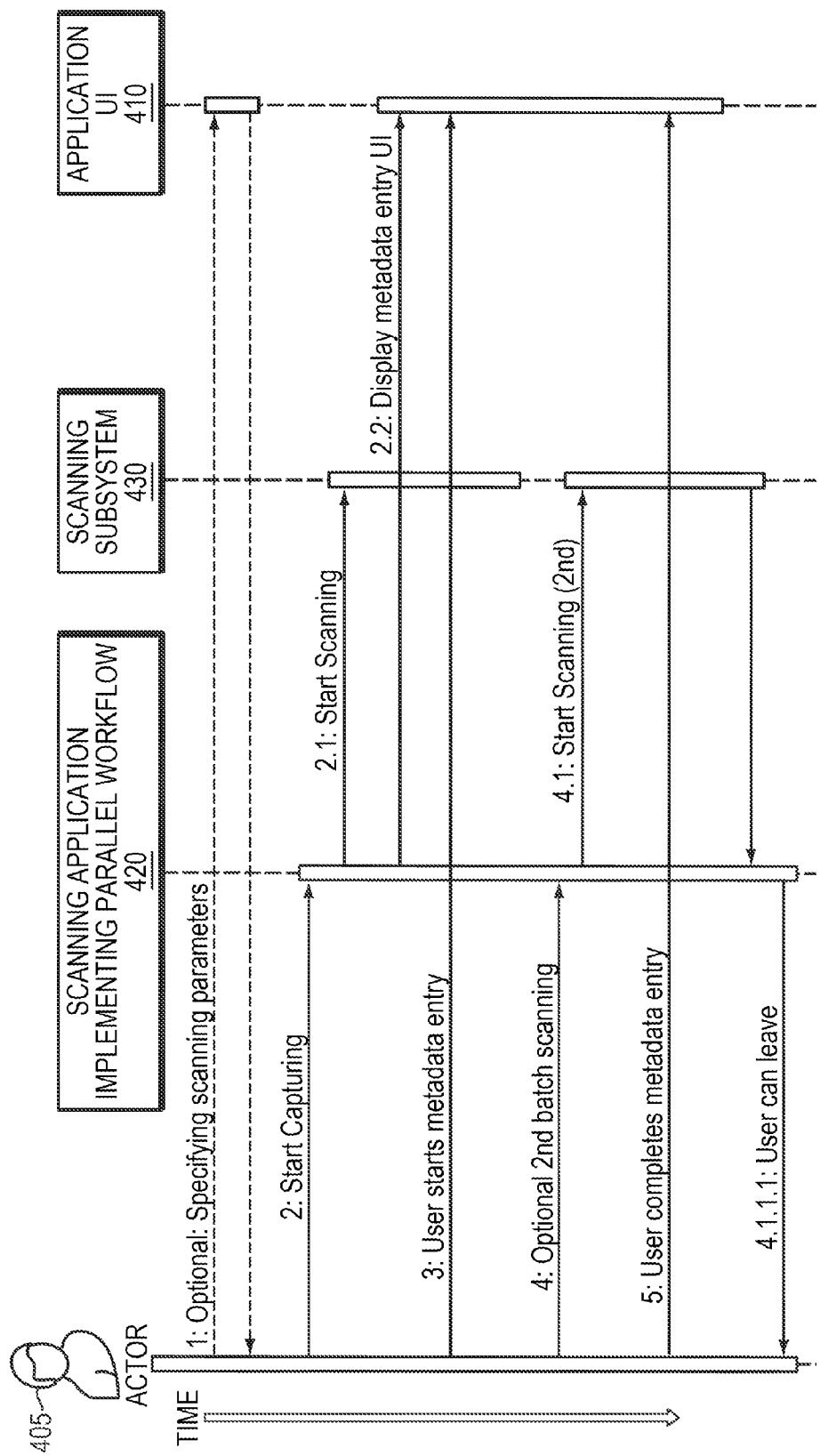

FIGS. 4A-C are flow diagrams illustrating processes 401-403 of scanning one or more documents in one embodiment, and illustrate operations between a user 405, controller 420, scanner 430 and user interface 410. The controller 420, scanner 430 and user interface 410 may be configured comparably to the controller 120, scanner 130 and user interface 110, respectively, as described above, as well as the comparable elements of FIGS. 3A-C.

As shown in FIG. 4A, the user 405 specifies scanning parameters at the user interface 410 (1). The user then initiates the scanning operation (2), and in response, the controller 420 causes the scanner 430 to begin scanning (2.1), and causes the user interface 410 to display a metadata entry interface (2.2). The user 405 may then begin metadata entry (3) at the user interface 410 at the same time as the scanner 430 is performing the scan of the document. The scanning is completed before metadata entry is complete. Thus, when the user 405 completes the metadata entry (4), the entire scanning operation is complete, and the user may leave the scanning system (2.3).

FIG. 4B illustrates a process 402 comparable to the process 401 of FIG. 4A, except that, here, the user 405 completes the metadata entry (4) before the physical scanning is completed (2.1.1). In such a case, the user 405 may wait until the physical scanning is complete, allowing the user to retrieve the original document from the scanner before leaving the scanning system (2.1.1.1).

FIG. 4C illustrates a process 403 comparable to the process 401 of FIG. 4A, except that multiple individual documents are scanned in succession. The user 405 specifies scanning parameters at the user interface 410, where the parameters may apply to the multiple documents (1). The user then initiates the scanning operation (2), and, in response, the controller 420 causes the scanner 430 to begin scanning (2.1) and causes the user interface 410 to display a metadata entry interface (2.2). The user 405 may then begin metadata entry for the multiple documents (3) at the user interface 410 at the same time as the scanner 430 is performing the scan of the first document. The scanning of the first document is completed before metadata entry is complete, and the user may position the second document for scanning (4, 4.1). When the user 405 completes the metadata entry (5) and the scanning of the second document is complete, then the user 405 may retrieve the original documents and leave the scanning system (4.1.1.1).

Figures 1, 5A:
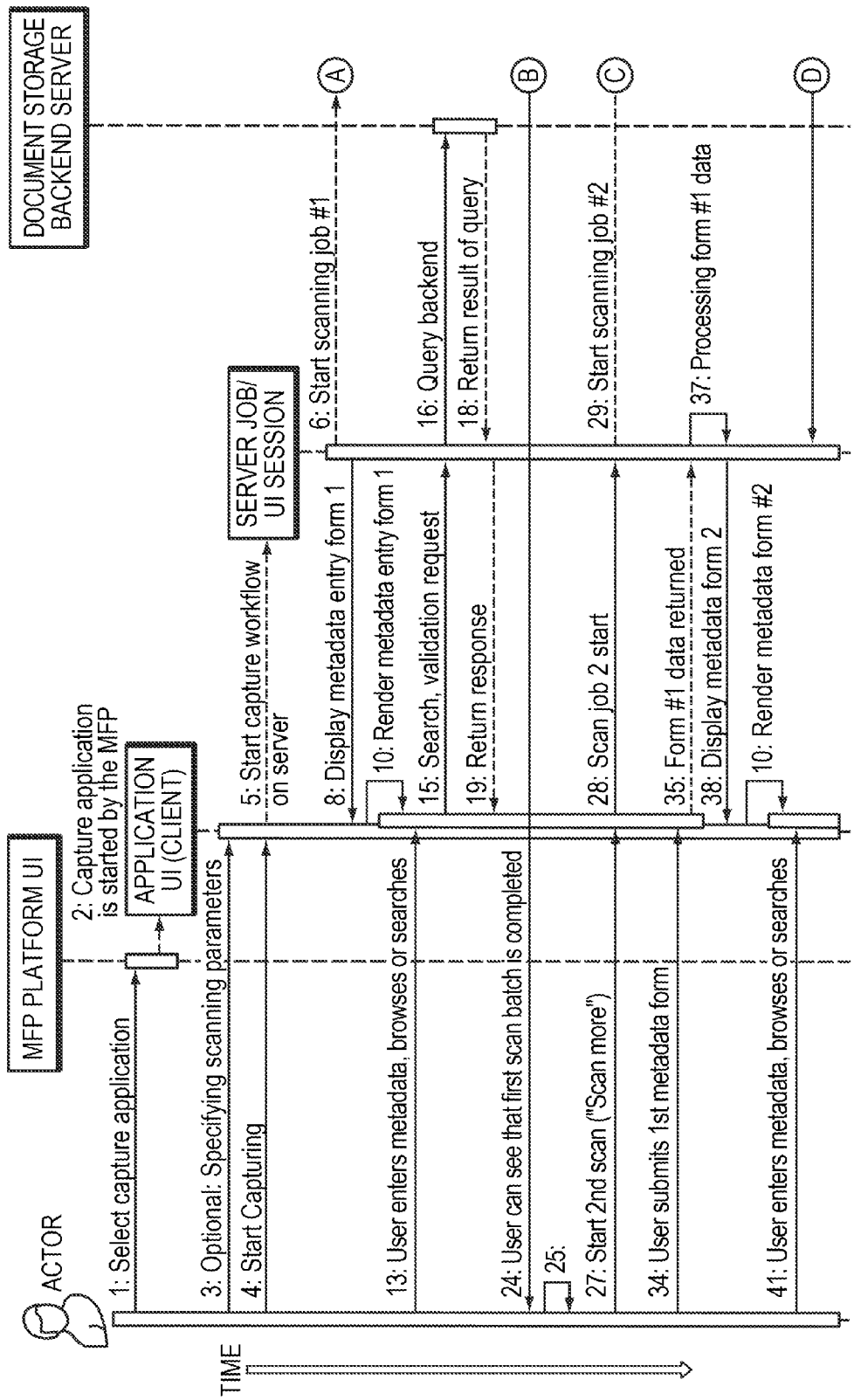
Figures 2, 5A:
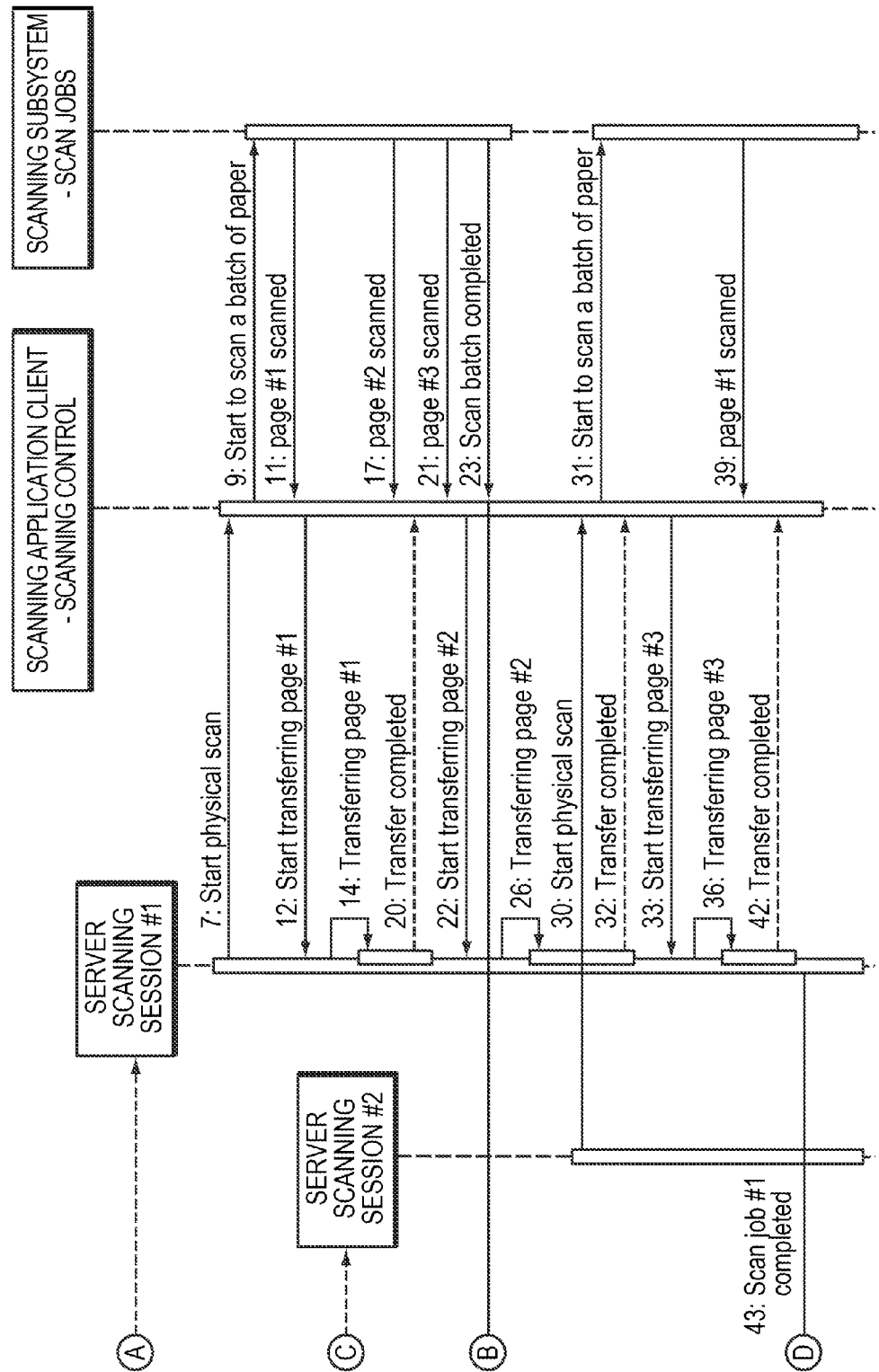
Figures 1, 5B:
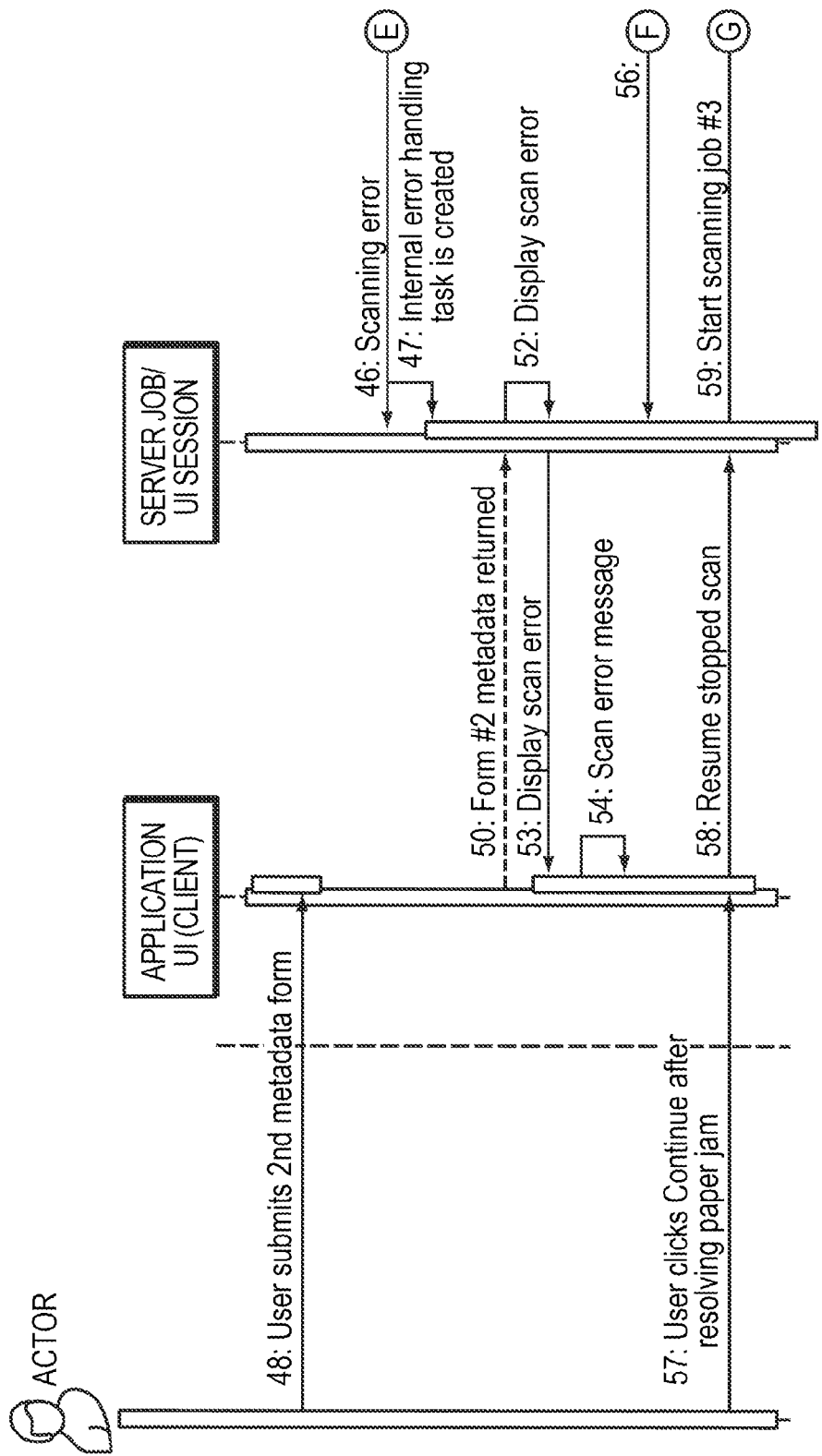
Figures 2, 5B:
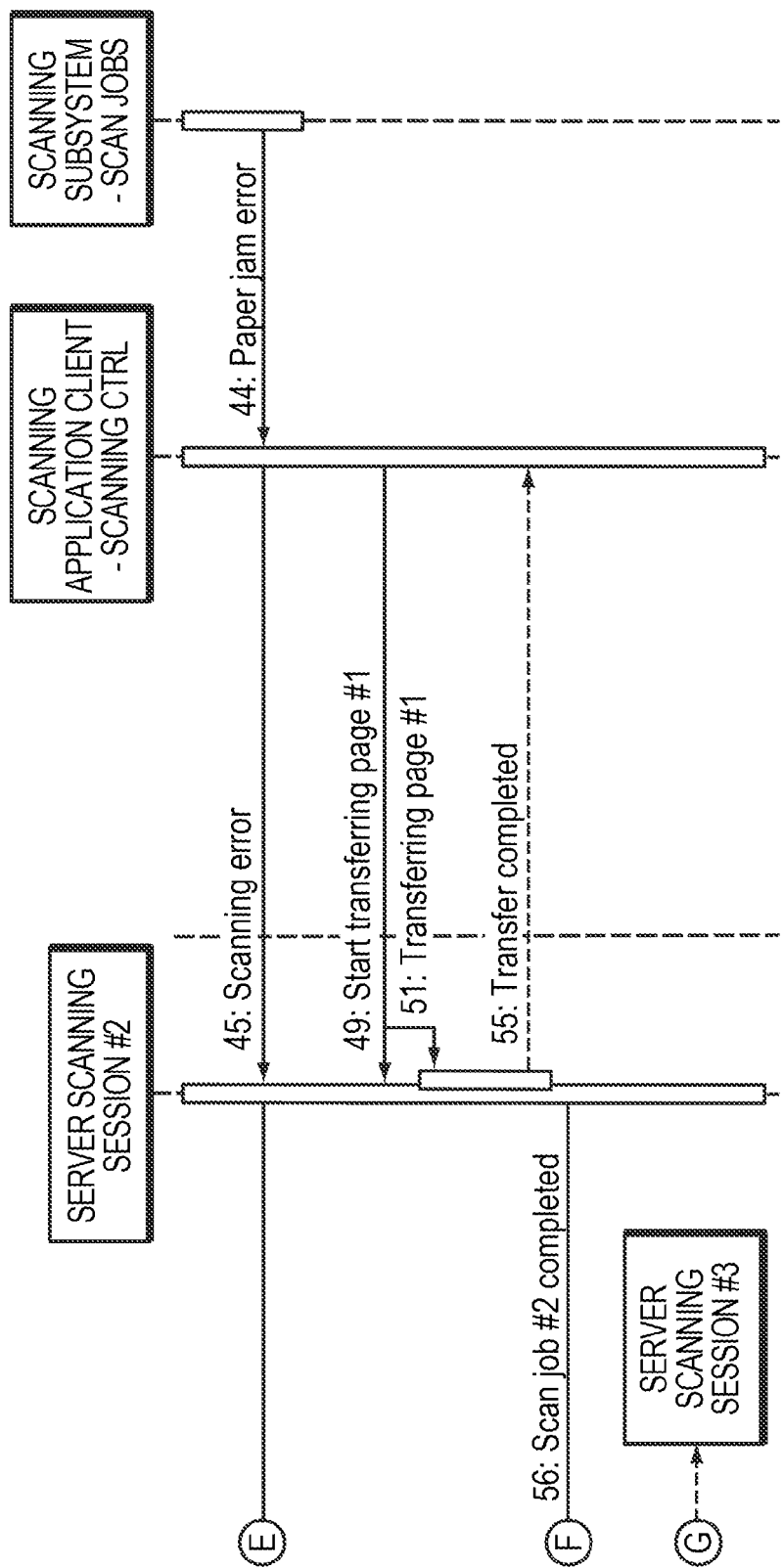
Figures 1, 5C:
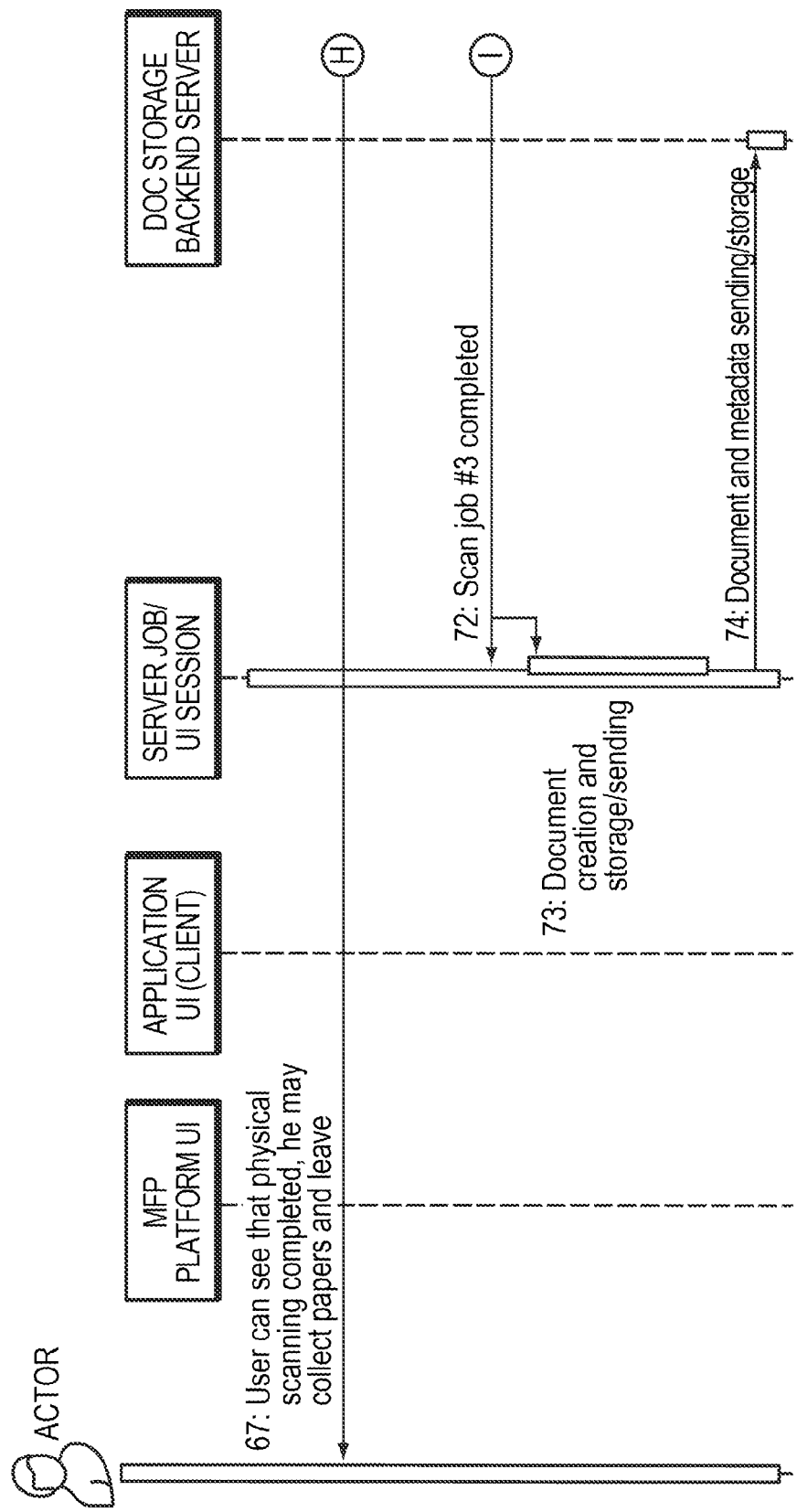
Figures 2, 5C:
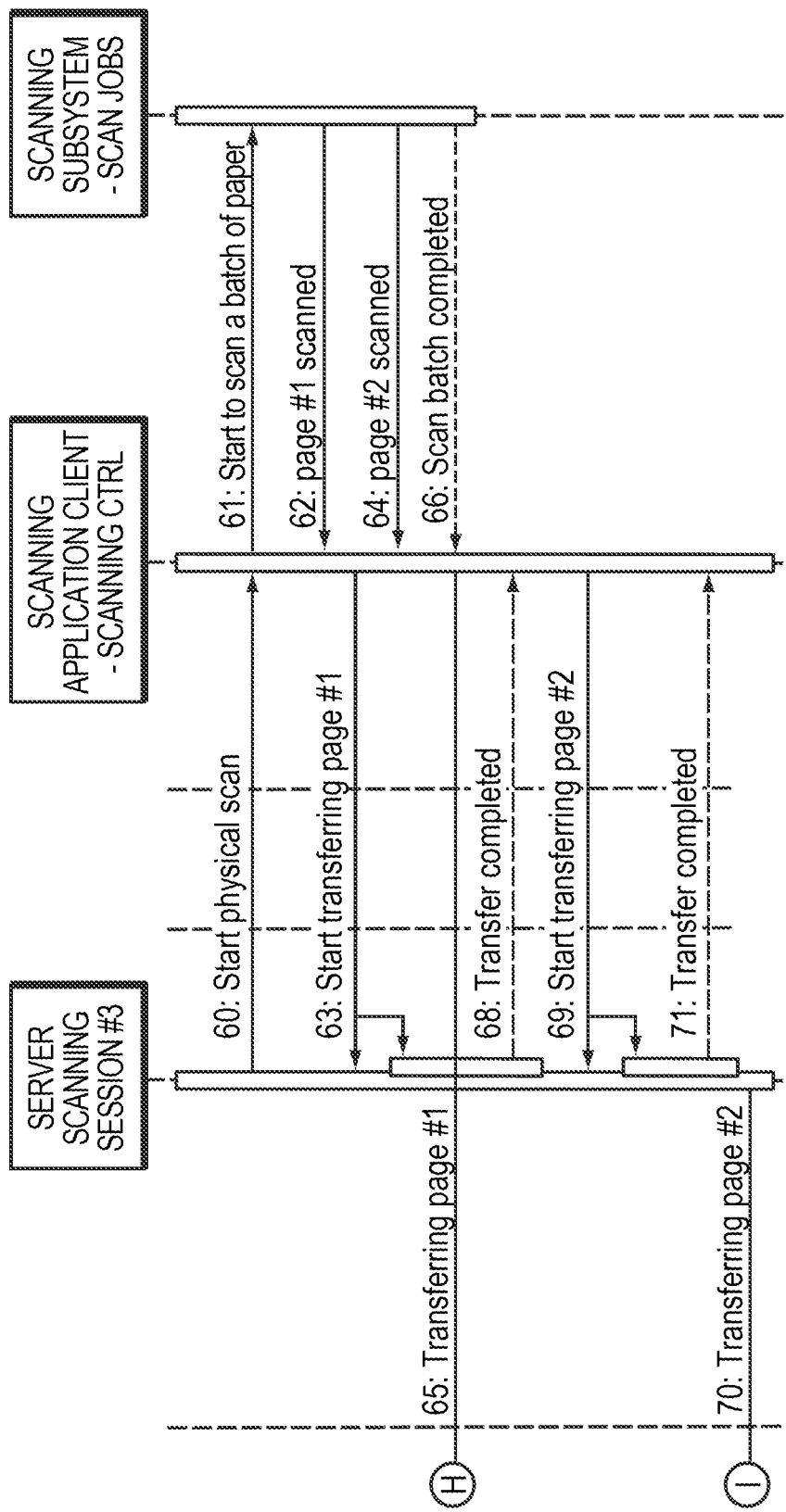

FIGS. 5A1-C2 are portions of a common flow diagram illustrating a process 500 of scanning a succession of documents in one embodiment. The process 500 may be carried out by any of the systems 100, 301-303 described above with reference to FIGS. 1 and 3A-C, respectively. In particular, the controller 120 described above with reference to FIG. 1 may be implemented as a "scanning application"

(SA) as described below. In a networked configuration, the SA may be implemented in a distributed manner across the network, and include a SA client component and a SA server component. Each element of the process 500 is labeled with a number in a sequence of 1-74, and is described in order below.

1. Select scanning application.

The user selects the icon/button representing the scanning application (SA) on the control panel of the multifunction printer (MFP).

2. Capture application is started by the MFP or by the device hosting the application.

The MFP platform software launches the SA, which displays its own user interface (UI) on the MFP's LCD touchscreen. Example embodiments may include the following features:

The MFP platform allows the application to be deployed and run on the MFP hardware (i.e., embedded platforms).

The web browser of the MFP loads the initial page of the SA application acting as a web application for HTML or similar content.

There is a separate device or computer with its own UI that hosts and runs the SA.

3. Optional operation: User changes scanning parameters via the SA user interface. The SA offers UI controls to change different scanning parameters like resolution, color mode, brightness, etc. These settings will be used when the next physical scanning takes place. This operation is optional, because the SA application in general may provide a per-workflow definable default setting.

4. START capture: The user starts the capture process, by selecting a pre-configured capture workflow, represented by an icon or pushbutton on the SA UI. It is also possible that a hardware button on the scanner can trigger this action.

5. A server-side workflow, backing and orchestrating the whole capture process is launched.

6. A scanning job (session) is started inside the workflow: The server is preparing to receive the scanned images from the MFP or from the SA client. An internal session identifier is used to identify the session and all the data object it controls, like folders in the file system. A processing thread is spawned or a process is started to monitor a communication channel or file system folder to where the digitalized images will be transferred.

7. Start physical scan: The creation of the scanning session triggers the physical scan operation on the MFP via the SA client component. It uses the APIs published by the MFP software platform, such as calling Web services or calling particular methods directly on the exposed API (platform dependent). The SA client manages the different scanner events (page scan ready, scanning errors, scanning ready, etc). The transfer of the scanned image files can be managed either by the SA client or by the MFP/platform, depending on the platform possibilities. In a client-server configuration, the target of the file transfer may be the SA server side component across a network (see #6).

8. Display metadata entry form #1:

In parallel with operation #6, (running in a separate computing thread or process) the UI handling part of the capture workflow is triggered as well. Based on the pre-configured workflow settings, the SA server composes the data entry forms and sends the first form to the SA client.

The sequence of #8-10-13-(15-16-18-19)-34-35 can be repeated as it is needed; in this sample diagram operations #38-40-41-49-51 do the same.

9. Start to scan a batch of paper (or the page on the flatbed of the scanner): As soon as the SA client invokes the proper methods to start the scan via the platform API, the MFP starts the scanning process, feeding the pages through the document feeder (or just scans a single page from the glass).

10. Render metadata form #1: The SA client renders the metadata entry form on the MFP UI. This may include various UI elements like text input box, selection lists, pushbuttons etc. The user is able to provide the necessary inputs on this form.

11. Page #1 scanned: As a result of operation #9, the next page is scanned and processed by the MFP and either provides the digitalized image to the SA client (in the scanner memory or in a file residing on the internal hard disk or similar data storage device of the MFP)
    Alternatively:
    starts the transfer of the images to the SA server component.

(See operations #11-17-21, #39 and #63-65.)

12. Start transferring page #1: As mentioned in operation #9, the server will receive the digitized image and store the received data in image files on the file system of the server. The transfer protocol is MFP vendor/platform dependent, and can happen via a network or a local USB interface by means of different standardized or proprietary protocols. The page transfer is represented by operations #12-14-20, #22-26-31, #32-36-42, #50-52-56, #64-66-70 and #71-72-73.

13. User enters metadata, browses or searches by using the UI controls of the form displayed. Examples:

The user may start to enter a user name into a field. After the user types some characters, a search request is sent to the SA server by the SA client for the user names starting with the typed-in string. See #15, 18

The user can see a folder tree of a file server (in a list or tree control format) that is the target of the document that will be a result of the capture workflow. By clicking the list or tree control, the user can browse in the folder structure.

The user can select from a list of values presented to him/her.

14. Representing the time slice in which the data transfer happens for the individual pages. See also #12.

15. Search or validation request is sent to the SA server: Entered data or data fragments can be validated on the server, or a search can be performed to help the user to select from a narrowed-down set of choices instead of typing in long strings. See #13, 16 and 18.

16. Query is sent to a backend server (optional): The query based on the user input used as search criteria or data to validate is sent to a backend server. Examples:

Issuing a query for the folder names starting with "Report" on the file server

Issuing a query for the user names in the corporate directory starting with "smi"

etc.

17. See #11.

18. Response from the backed server is returned to the SA server.

19. SA server returns the necessary data: It can be a list of values, or a message to the user if the data validation failed.

20. Page transfer completed: Page image data transfer is completed. Depending on the transfer protocol, this can be a message from the SA server component or simply the part of the file transfer protocol implemented by the operating system (transparent to the SA components). Operations #32, 42, 56, 70, 73 have the same function.
21. See #11.
22. See #12.
23. Scan batch completed: The MFP detected that there are no more pages in the feeder/the scanning of a single page has finished from the glass. A notification is sent either to the SA client or to the SA scanning component, depending on the device platform.
24. User can see that the first batch is completed: As all the pages passed through the document feeder of the scanner, the user can put another batch of paper into the feeder, if she/he has more papers to scan.
25. The user decides to scan a second batch of papers, so she/he puts the paper into the document feeder or onto the glass.
26. See #12.
27. The user clicks the "Scan More" button on the UI to start the scan of $2^{nd}$ batch.
28. The SA client triggers the new scanning (inside the same capture workflow) on the SA server.
29. On the SA server, a new scan session is starting, with a new scan session ID—see #6.
30. Similarly to operation #7, the physical scanning is started by triggering this operation on the SA client.
31. See #9.
32. See #20.
33. See #12.
34. User submits $1^{st}$ metadata form: When the user completes the data entry on the form, by selecting the proper UI control element (OK, Next, Submit or similar button), she/he allows the system to move forward in the capture workflow.
35. Form #1 data returned to the SA server: The data of the submitted form is transferred to the SA server workflow, and stored as part of the workflow session data.
36. See #14.
37. Processing form #1 data: The SA server workflow determines what will be the next metadata form (if there is any) and prepares the form for display to the user.
38. Display metadata form #2: See #8.
39. See #11.
40. See #10.
41. See #13.
42. See #20.
43. Scan job completed: Internal notification from the scanning session started by #6 that all of the pages for that scanning session is transferred and ready for processing. The scan session goes into a passive mode (will not handle any page transfer or other scan events).
44. Paper jam error (or other error reported by the MFP device to the SA client):
    The scanning subsystem of the MFP notifies the SA client about the error and scanning stops.
45. Scanning error event is forwarded from the SA client to the SA server's scan session.
46. Scanning error event is forwarded to the SA server workflow.
47. Internal error handling task is created.
48. User continues to enter metadata and submits form #2. At this stage, the user interface still display/maintains the data entry form and no disruptive error message is shown. Certainly the user may see that the physical scanning has stopped, or there can be a non-disruptive way of indicating that there was a scanning error (e.g. a short message in a status line on the display).
49. The page transfer of the pages scanned in #39 starts. (The stopped physical scan does not affect this process)
50. After #48 the form data is returned to the SA server where it is processed, similarly to #35.
51. See #14.
52. The internal error handling task created in #47 will prepare the error message/form for the user to inform him/her about the reason of the scan stoppage.
53. The error message/form is sent to the SA client for displaying.
54. The error message/form is rendered, providing options/instruction how the situation can be resolved. (e.g., Continue and Cancel options)
55. See #20.
56. See #43.
57. User proceeds to resolve the error, then interacts with form displayed in #54, selecting an offered option.
58. Error form is closed, the UI returns to its normal state. Depending on the option the user selected, the capture process may be cancelled, or continued.
    Of course, if there are still other metadata entry forms to process, any number of sequence of operations similar to #8-10-13-(15-16-18-19)-34-35 can be repeated until all the metadata is captured.
59. Start scanning job—see #29.
60. See #7.
61. See #9.
62. See #11.
63. See #12.
64. See #11.
65. See #14.
66. See #23.
67. Physical scan is completed, the user can see that papers can be collected and the user may leave. In this example sequence, the physical scanning is completed later than the metadata entry. In other cases, metadata entry may last longer.
68. See #20.
69. See #12.
70. See #14.
71. See #20.
72. See #43.
73. Document creation and storage/sending activities: The SA server performs the necessary image and document processing operations, like image conversion, cleanup, compression, OCR, document building and indexing, and combining the user provided metadata into an output document or into a set of document and satellite metadata files.
74. Document and metadata sent to the destination preconfigured by the workflow or selected by the user driving the capture workflow: This is the final and closing phase of the capture workflow, when the created document file(s) and metadata is sent to the destination. Some of the metadata items may be incorporated into/used for the final documents (such as document properties as like filename, author information, description, encryption password, maximum file size to perform automatic splitting, etc.) while other metadata items can be sent to the destination via the proper APIs, along with the document(s) (e.g., SharePoint document metadata fields like comments, keywords, classification information etc.).

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should also be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A system for scanning documents comprising:
   a scanner configured to scan at least one document to produce an electronic copy of the at least one document;
   a user interface configured to capture metadata entered by a user regarding the at least one document; and
   a controller communicatively coupled to the scanner and the user interface, the controller configured to enable the user interface to capture the metadata concurrently with the scanner's scanning the at least one document, the controller further configured to associate the electronic copy and the metadata.

2. The system of claim 1, wherein the controller is further configured to update the electronic copy to incorporate at least a portion of the metadata.

3. The system of claim 2, wherein the metadata includes at least one of a filename, a file path, bibliographic information, and a watermark.

4. The system of claim 1, wherein the controller is further configured to extract content of the at least one document from the electronic copy and modify the metadata to incorporate at least some of the content.

5. The system of claim 1, wherein the at least one document includes a plurality of documents, and wherein the controller is further configured to enable the user interface to capture metadata for the plurality of documents concurrently with the scanner's scanning the plurality of documents.

6. The system of claim 1, wherein the controller is further configured to detect an interrupt event from the scanner or the user interface.

7. The system of claim 6, wherein the controller is further configured to control the user interface to display selectively the interrupt event and a prompt to capture the metadata based on a respective priority.

8. The system of claim 1, wherein the controller is further configured to define parameters for the scanning of the at least one document based on a selection by a user at the user interface.

9. The system of claim 1, wherein the controller is further configured to modify the electronic copy based on information entered by the user at the user interface.

10. The system of claim 9, wherein the information indicates an image transformation for the electronic copy.

11. The system of claim 1, wherein the controller is communicatively coupled to the scanner across a network.

12. The system of claim 1, wherein the user interface is incorporated into a computing device communicatively coupled to the scanner across a network.

13. The system of claim 12, wherein the controller is incorporated into the computing device.

14. The system of claim 12, wherein the controller is incorporated into a server communicatively coupled to the scanner across the network.

15. The system of claim 1, wherein the scanner is further configured to generate at least one physical copy of the at least one document.

16. The system of claim 1, wherein the controller is further configured to be communicatively coupled to a plurality of scanners including the scanner.

17. The system of claim 1, wherein the controller is further configured to define parameters for the destination of the electronic copy based on a selection by a user at the user interface.

18. An apparatus for scanning documents comprising:
    at least one interface configured to communicatively couple to a scanner and a user interface; and
    a controller configured to enable the user interface to capture metadata entered by a user concurrently with enabling the scanner to scan at least one document to generate a respective electronic copy, the controller further configured to associate the electronic copy and the metadata.

19. A method of scanning documents comprising:
    enabling a user interface to capture metadata entered by a user;
    enabling a scanner to scan at least one document concurrently with capturing the metadata; and
    associating the electronic copy and the metadata.

20. The method of claim 19, further comprising updating the electronic copy to incorporate at least a portion of the metadata.

* * * * *